March 7, 1967 L. F. LEMM 3,307,289
ULTRASONIC APPARATUS FOR SUBSURFACE SOIL STERILIZATION
Filed Nov. 1, 1965 3 Sheets-Sheet 1

INVENTOR.
LESTER F. LEMM
BY Beehler & Arant
ATTORNEYS

INVENTOR.
LESTER F. LEMM
BY Bechler & Arant
ATTORNEYS

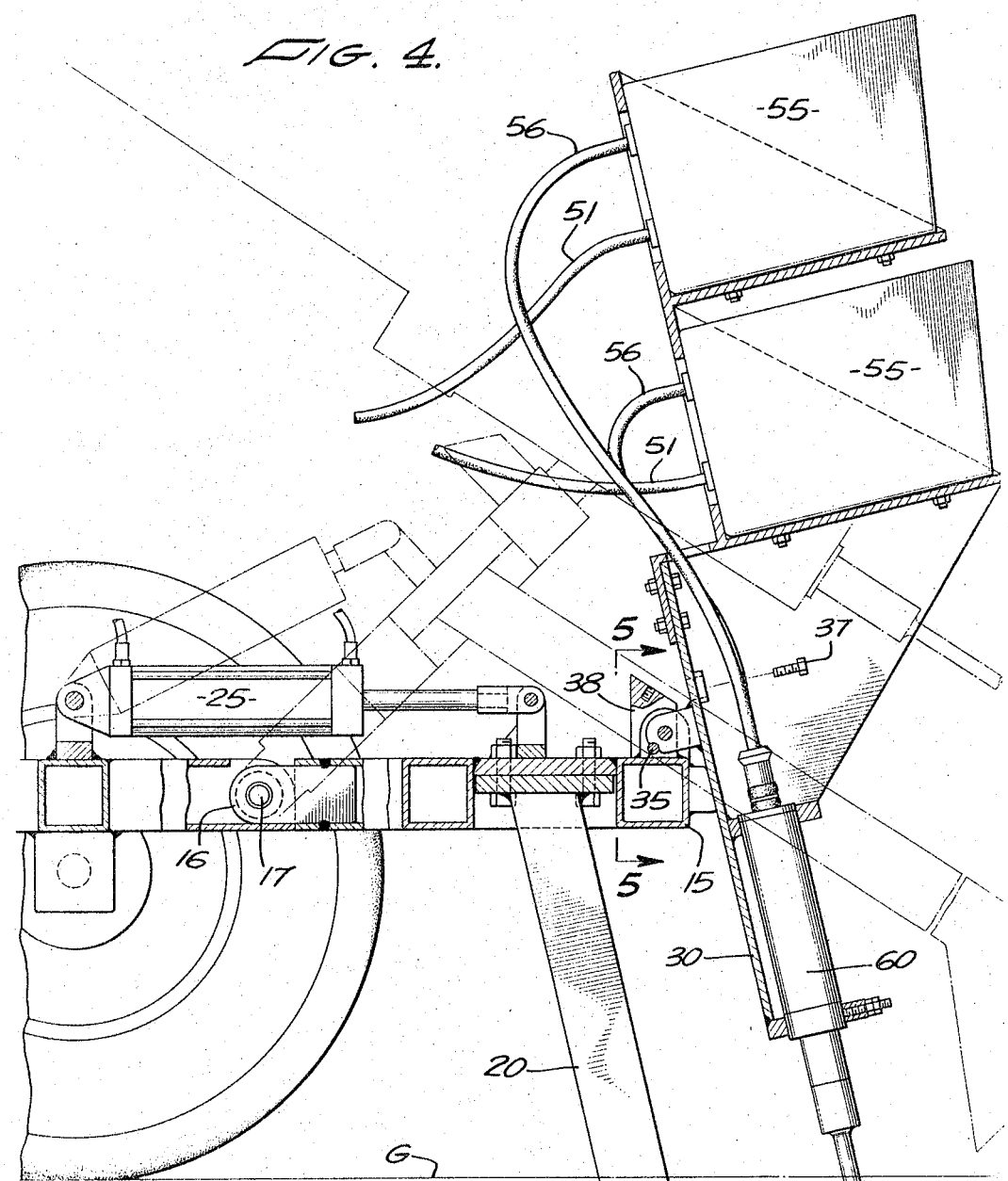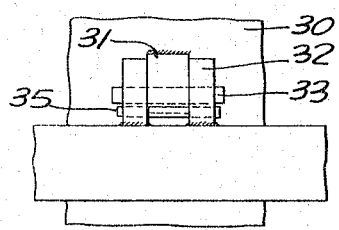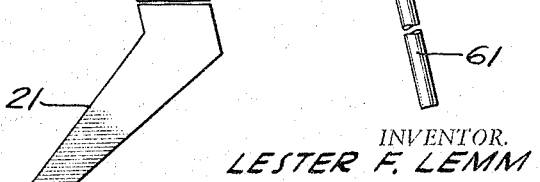

United States Patent Office 3,307,289
Patented Mar. 7, 1967

3,307,289
ULTRASONIC APPARATUS FOR SUBSURFACE
SOIL STERILIZATION
Lester F. Lemm, 8180 E. 21st St.,
Westminister, Calif. 92683
Filed Nov. 1, 1965, Ser. No. 505,920
5 Claims. (Cl. 43—124)

The present invention relates to a method and apparatus for subsurface soil sterilization, by utilizing ultrasonic energy.

During recent years in the United States the agricultural damage from nematodes alone has reached many billions of dollars annually. Various chemicals have been utilized to treat the soil in order to kill the nematodes, but the material and labor costs of this method of treatment has become increasingly expensive. Furthermore, the chemical treatments are inherently undesirable because of certain side effects from the chemical materials used.

According to the present invention the subsurface regions of the soil, a few inches beneath the surface, are sterilized by the application of ultrasonic energy vibrations. A procedure or method as been developed which, at least in certain situations and for certain purposes, is economically superior to the chemical treatment methods heretofore used.

The principal object of the invention, therefore, is to provide a novel and economical method for subsurface soil treatment, by utilizing ultrasonic energy vibrations.

Another object of the invention is to provide apparatus which is suitable and operates efficiently for the purpose of subsurface soil sterilization utilizing ultrasonic energy vibrations.

While the nematode is the primary target with which the present invention is concerned, application of the method also results in killing bacteria and other living organisms, and this result is found to be desirable and satisfactory. It must not be assumed that the purpose of the present invention is to eliminate living organisms including nematodes and bacteria in the subsurface soil regions; on the contrary, the purpose of the present invention is to sterilize the subsoil down to a depth of a few inches, or perhaps somewhat more than a foot, in order to give the crop that will subsequently be planted in the soil an opportunity to successfully complete its growing cycle without being unduly hampered by the nematodes or other organisms. It is assumed that, in most circumstances, another sterilization of the soil will be required after one crop has been harvested and removed from the agricultural field, and before the next crop is planted.

The objects and advantages of the invention will be more fully understood from the following description considered in conjunction with the accompanying drawings, wherein:

FIGURE 4 is a side elevational view of the machine, partially in cross-section, showing the raising and lowering action of both the blade support frame and the transducer support frame;

FIGURE 5 is a detailed view taken on the line 5—5 of FIGURE 4; and

Figure 1:
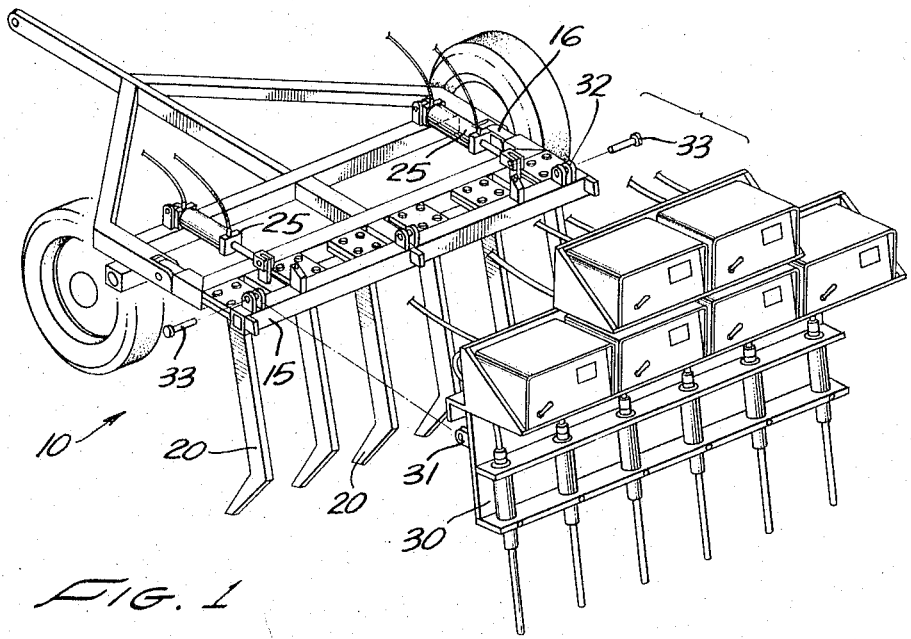
FIGURE 1 is a perspective view of the presently preferred form of apparatus utilized for carrying out the novel method of the present invention, and showing the transducer support carriage in a detached position.
Figure 2:
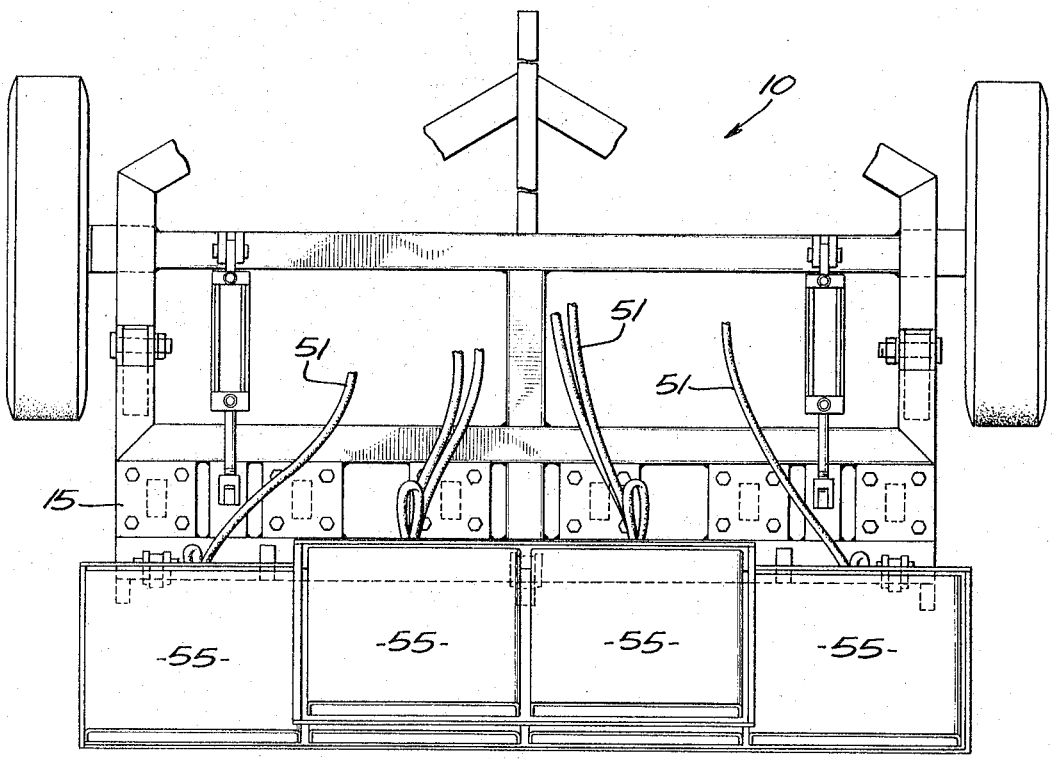
FIGURE 2 is a top plan view of the apparatus of FIGURE 1 with the transducer support frame in its normal, attached position, but not showing the motor-generator that forms a part of the apparatus.
Figure 3:
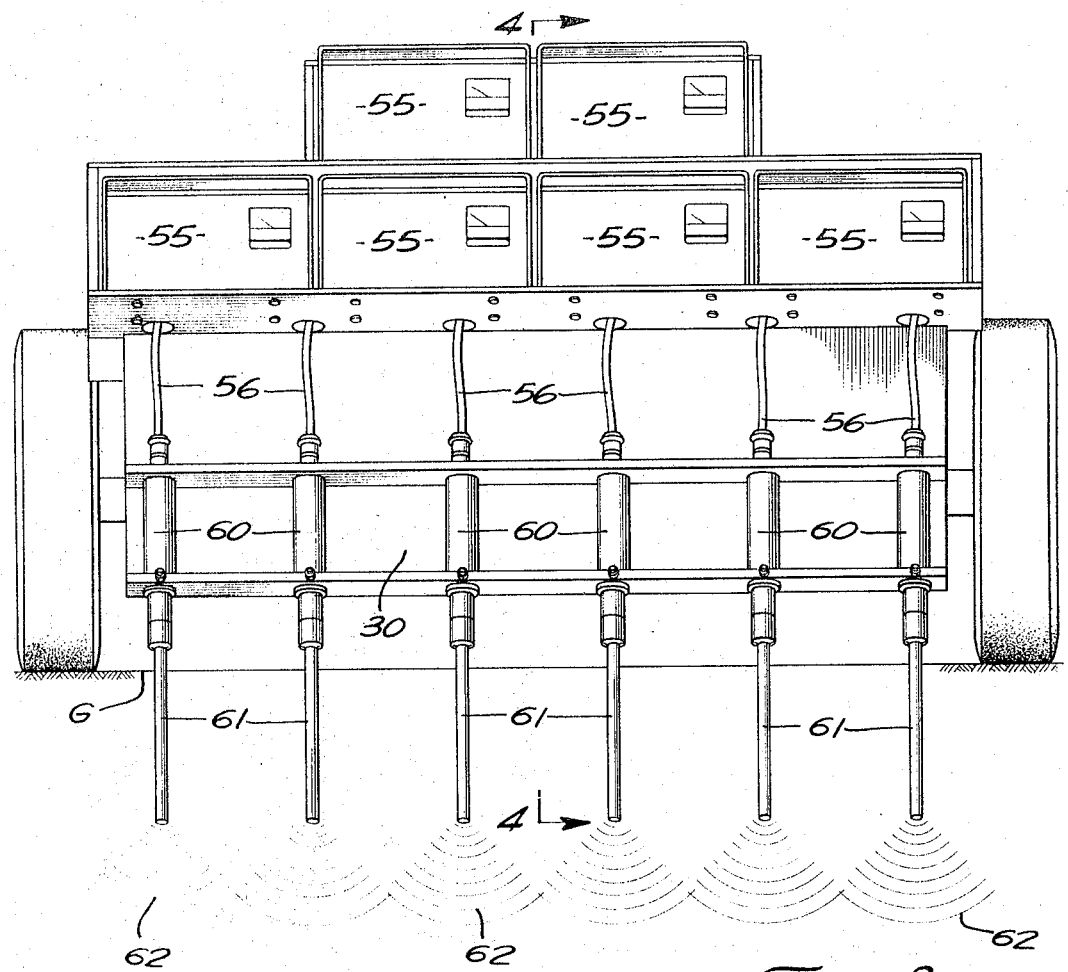
FIGURE 3 is an elevational view taken from the rear of the machine and showing the subsurface application of ultrasonic energy.

In accordance with the novel method of the present invention it is preferred to first wet the soil, in order to increase its energy transmission capability. Thereafter the ultrasonic energy is applied to the subsurface region at a plurality of separate points simultaneously, by means of utilizing a corresponding number of ultrasonic transducers. The use of a number of transducers concurrently is dictated by the fundamental nature of the problem itself. That is, it is desired to sterilize a large land area, typically a great many acres, but only to a limited depth of a few inches or possibly a little more than a foot. It has been found that utilizing a single ultrasonic transducer of large size, either by placing it above the surface of the ground or below the surface of the ground, is a less satisfactory alternative than utilizing a fairly large number of relatively small transducers and placing them below the surface of the ground.

In order to carry out the method of the invention on an economical basis, with minimum wear and tear of eqiuipment, it is also desirable and in fact necessary to utilize cutting blades which create paths in the soil that will be followed by the ultrasonic transducers. For reasons of economy it is greatly preferred to move the cutting blades, which may be similar to ordinary cultivating blades, at the same time that the transducers are being moved and by means of the same motive force. However, the apparatus for carrying out this purpose could assume many and divers forms, some of which will be readily suggested by the apparatus herein disclosed, while others would not be immediately obvious but could be devised.

An essential step of the method of the present invention is the wetting of the soil prior to the subsurface application of ultrasonic energy. Various means of wetting the soil are well-known, including the expedient of simply waiting for rain to fall; therefore, no specific illustration is given of the step of wetting the soil.

From the foregoing description of the novel method of the persent invention it is believed that the purpose and the general manner of usage of the illustrated apparatus will be readily understood, and accordingly, reference is now made to the drawings for a detailed description of the presently preferred form of apparatus which is illustrated therein.

The apparatus includes, in general, a wheeled vehicle carriage 10 which is of conventional construction and conventional in its mode of operation. A blade support frame 15 is pivotally coupled to the rearward edge of the carriage 10, and a plurality of cutting blades 20 are attached to the frame 15 and extend vertically downward therefrom. The rotatable or pivotal support for the blade support frame 15 includes hinges 16 and pivot pins 17 which fasten the hinge portions together. In order to control the raising and lowering of the blades 20, a lifting mechanism 25 is provided, which includes a pair of hydraulic cylinders which are coupled in conventional fashion both to the wheeled carriage 10 and to the blade support frame 15.

A transducer support frame 30 is pivotally coupled to the rearward edge of blade support frame 15, as may best be seen in FIGURE 4. The ultrasonic transducers 60 are attached to the lower portion of frame 30 while the associated oscillators 55 are attached to its upper part. The pivotal mounting of the transducer frame 30 to the blade support frame 15 includes hinge portions 31 and 32 and the pivot pins 33.

The hydraulic cylinders comprising the lift mechanism 25 are provided with conventional hydraulic control means, not shown, so that the blade support frame 15 may be maintained either in its fully raised position or in its fully lowered position, as may be desired. It is also advisable to be able to maintain the transducer support frame 30 in either a fully raised position or a fully lowered position. Accordingly, in conjunction with the hinge or pivot mechanism, there are provided pins 35 which are utilized for locking the transducer frame in its lowered position. See FIGURES 4 and 5. When these pins are removed and the transducer frame is raised, bolts 37 are then passed through appropriate openings in the transducer frame into a threaded stud 38 which serves to hold the transducer frame in its raised position. It will be noted that in FIGURE 4, dotted lines are employed to illustrate the positions that the blade support frame and transducer support frame will occupy when the lift mechanism 25 is contracted to raise the blades 20 out of the ground. The position that the transducer support frame occupies when it is pivoted up, or raised, and while the blades remain in the ground, is not specifically shown, but can nonetheless be clearly understood.

Figure 6:
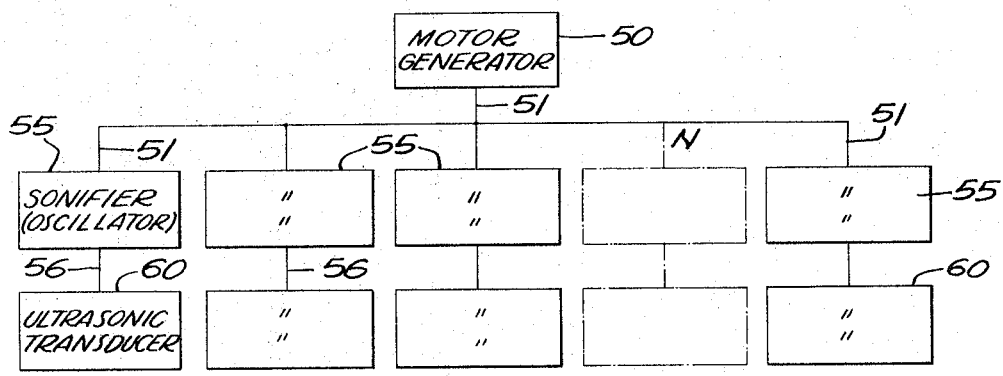
FIGURE 6 is a schematic diagram of the electrical system.

The electrical system of the apparatus is illustrated schematically in FIGURE 6 of the drawings. It includes a motor-generator 50, a number of oscillators 55, and an equal number of ultrasonic transducers 60. Cables 51 couple the output energy from the motor-generator to the inputs of the various oscillators 55; and a separate cable 56 is utilized to couple the output energy from each oscillator to its respectively associated ultrasonic transducer 60. It will be understood that the energy supplied by the motor-generator 50 may be in a direct current form, or in an alternating form at any desired frequency, whereas the energy supplied by the various oscillators 55 is vibrating energy at an ultrasonic frequency. While the successful use of the method of the present invention is not limited to any particular frequency, an ultrasonic frequency of 20,000 cycles per second is typical and provides satisfactory results.

To initiate the operation of the apparatus, the transducer frame is preferably raised relative to the blade support frame, and the blade support frame is also raised relative to the vehicle carriage 10. The blade support frame is then lowered by means of the power driven hydraulic cylinders 25, so that the blades dig into the soil, and at the same time the vehicle carriage 10 is driven or pulled forward. Thereafter, when initial openings have been provided for them, the transducers 60 are lowered into the ground by pivoting the transducer frame 30 to its lowered position and then locking it in place by use of the locking pins 35.

While various forms of ultrasonic transducers may be utilized, the illustrated form is presently preferred, and includes an extended shank 61 whose typical length is 14 inches. The transducers 60 may, for example, be of the type sold by Branson Instruments, Incorporated, Danbury, Connecticut, under their designations S–250 and T–150, as described in Bulletin F–885, published January, 1964.

The invention has been described in considerable detail in order to comply with the patent laws by providing a full public disclosure of at least one of its forms. However, this detailed description is not intended in any way to limit the broad features or principles of the invention, or the scope of patent monopoly to be granted.

What is claimed is:
1. Apparatus for subsurface soil sterilization, comprising, in combination:
a transportable unit including a plurality of cutting blades adapted to be substantially vertically positioned in the ground and being spaced apart in a direction transverse to the direction of forward travel;
electrical power generating means carried by said transportable unit;
a plurality of ultrasonic transducers carried by said transportable unit, each being adapted to extend downwardly behind an associated one of said cutting blades;
a plurality of electrical oscillators carried by said transportable unit, each being adapted to oscillate at a predetermined ultrasonic frequency;
means coupling said power generating means to the inputs of all said oscillators for supplying energy thereto; and
separate means coupling the output of each of said oscillators to a respectively associated one of said ultrasonic transducers for drivingly energizing the same.

2. Apparatus as claimed in claim 1, wherein:
said transportable unit includes a wheeled vehicle frame, a blade support frame pivotally coupled to said vehicle frame, and means for selectively raising or lowering said blade support frame; said cutting blades being attached to said blade support frame.

3. Apparatus as claimed in claim 2, wherein:
said transportable unit further includes a transducer support frame pivotally coupled to said blade support frame, and means for selectively fastening said transducer support frame in either a raised or a lowered position; said transducers being attached to said transducer support frame.

4. Apparatus as claimed in claim 2, wherein:
said raising or lowering means includes a pair of hydraulic cylinders.

5. Apparatus as claimed in claim 3, wherein:
said oscillators are also attached to said transducer support frame.

References Cited by the Examiner

UNITED STATES PATENTS

| | | | |
|---|---|---|---|
| 1,953,677 | 4/1934 | Glover | 43—124 X |
| 3,093,761 | 6/1963 | Case | 310—28 |
| 3,231,025 | 1/1966 | Bodine | 172—40 |

ABRAHAM G. STONE, *Primary Examiner.*

ROBERT E. BAGWILL, *Examiner.*